W. SCHNECKLOTH.
STEERABLE DRIVE GEARING.
APPLICATION FILED MAY 29, 1914.
1,160,958.
Patented Nov. 16, 1915.
3 SHEETS—SHEET 3.
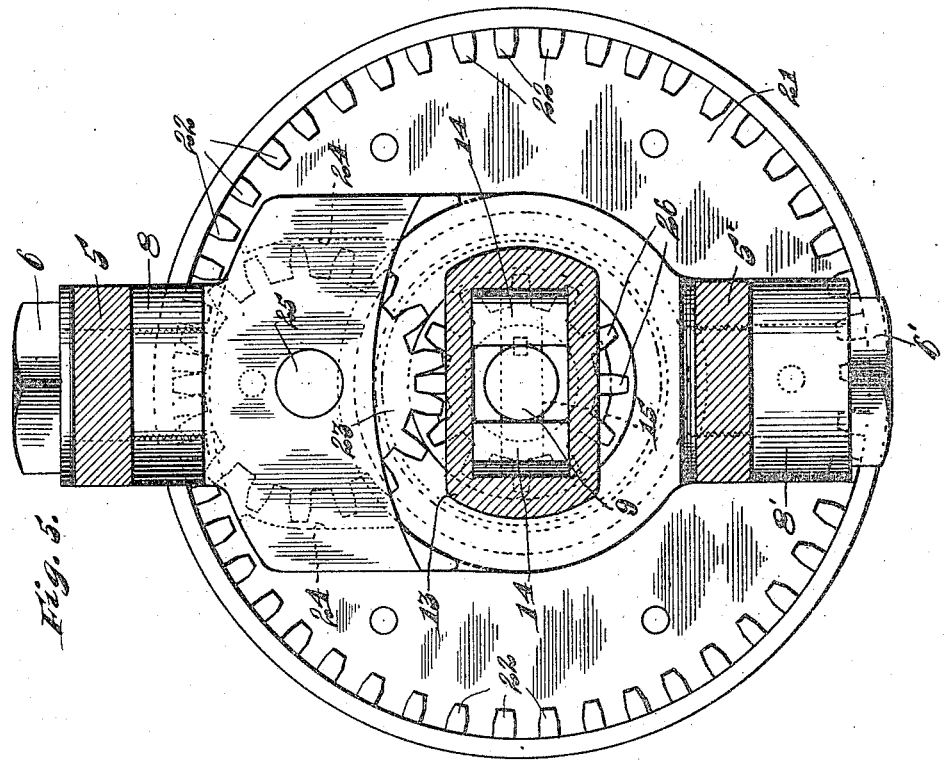
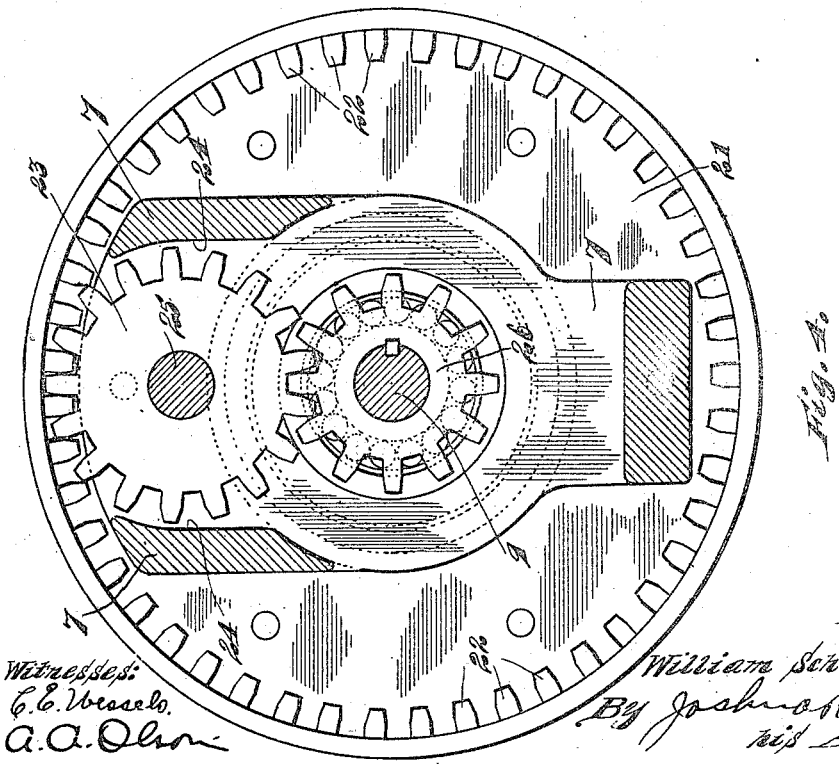

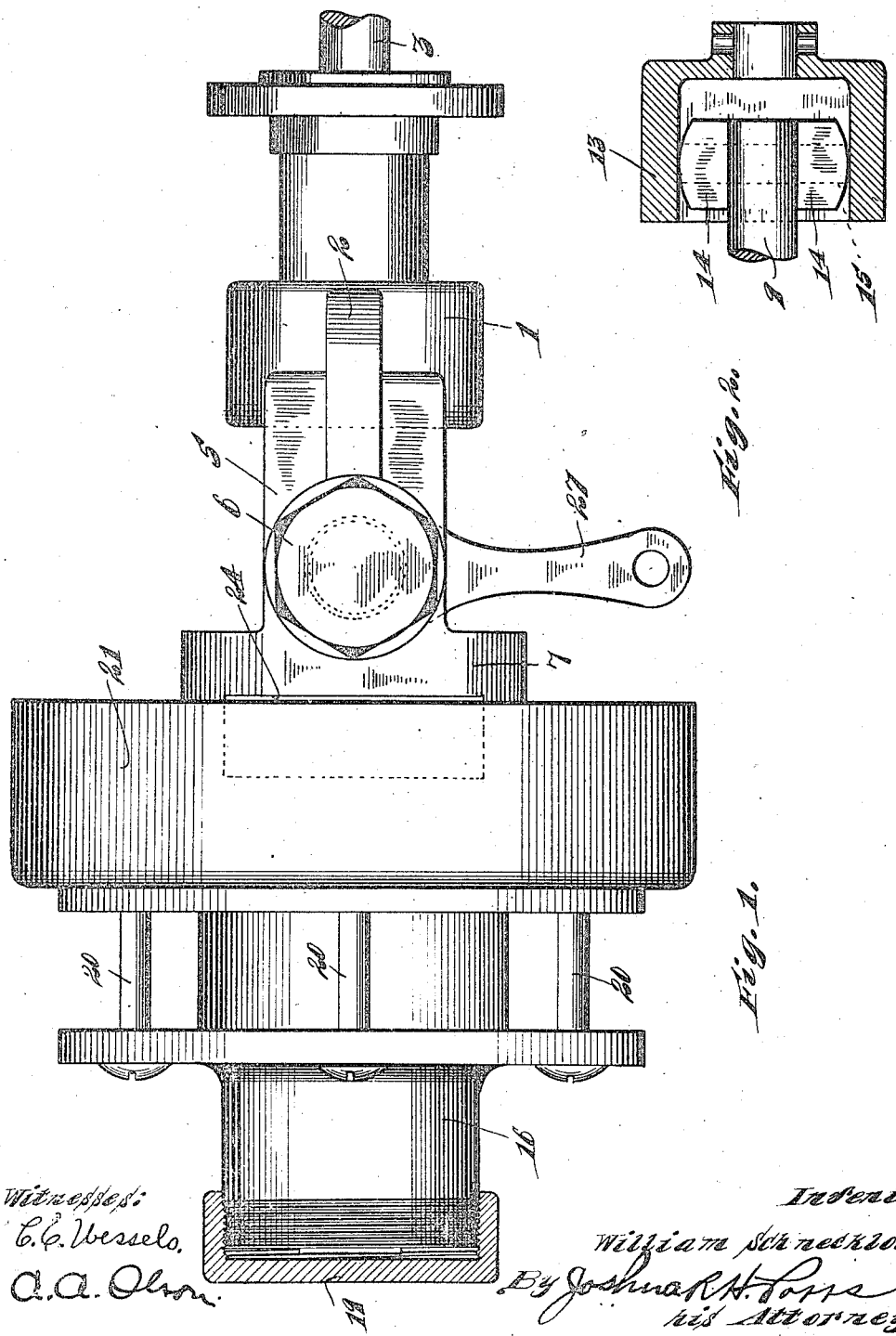

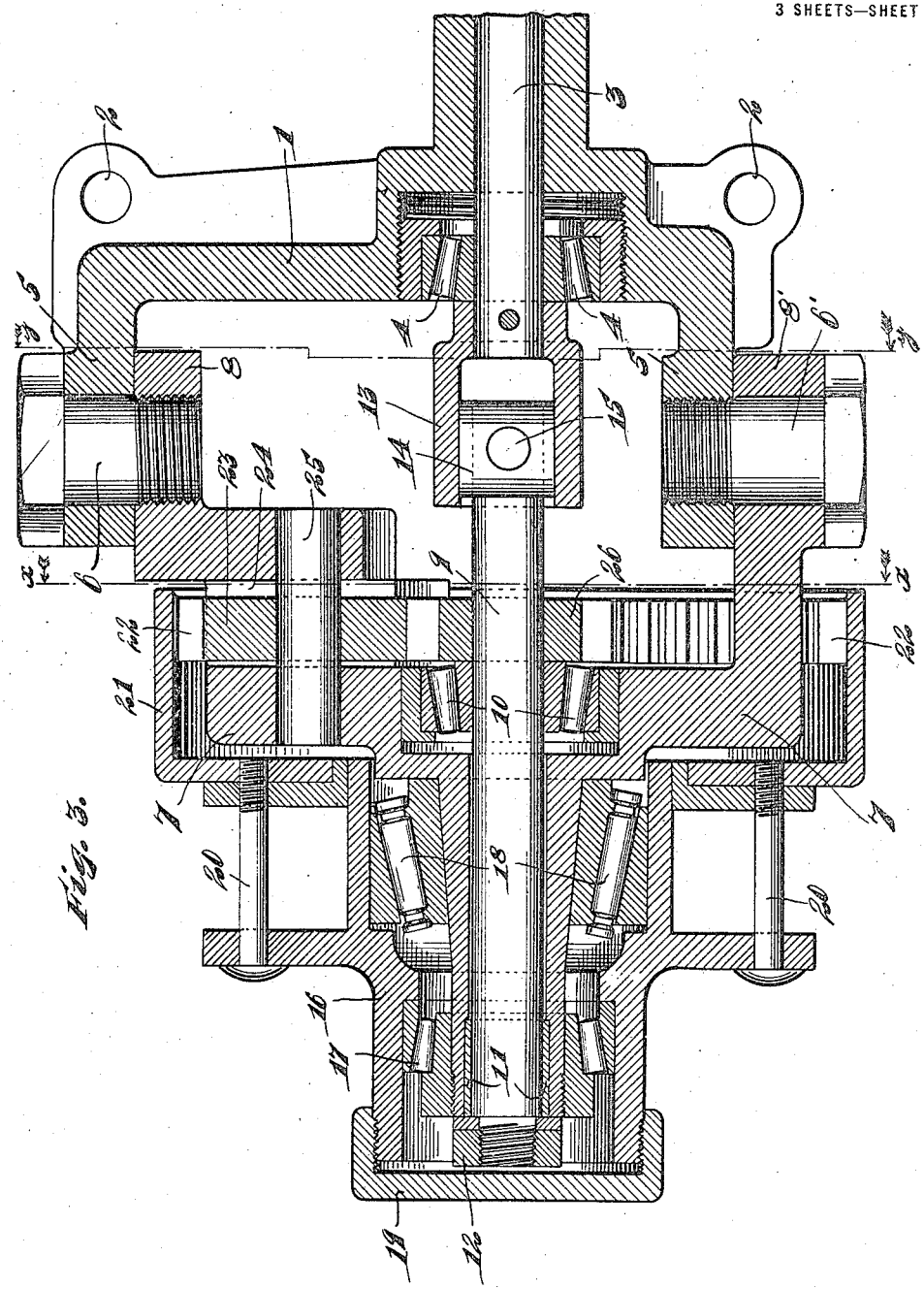

UNITED STATES PATENT OFFICE.

WILLIAM SCHNECKLOTH, OF CHICAGO, ILLINOIS.

STEERABLE DRIVE-GEARING.

1,160,958.  Specification of Letters Patent.  Patented Nov. 16, 1915.

Application filed May 29, 1914. Serial No. 841,770.

*To all whom it may concern:*

Be it known that I, WILLIAM SCHNECKLOTH, a citizen of the United States, and a resident of the city of Chicago, county of Cook, and State of Illinois, have invented certain new and useful Improvements in Steerable Drive-Gearing, of which the following is a specification.

My invention relates to steerable drive gearing and more specifically to gearing designed for use in connection with trucks or other vehicles whereby the steering wheels thereof may be also utilized as driving wheels.

The object of my improvement is the production of mechanism as mentioned which will be of durable and economical construction and efficient in operation.

Other objects will appear hereinafter.

With these objects in view my invention consists in the combinations and arrangements of parts hereinafter described and claimed.

The invention will be best understood by reference to the accompanying drawings forming a part of this specification, and in which—

Figure 1 is a top plan view, partly in section, of a steerable drive gearing embodying my invention, Fig. 2 is a sectional detail of the universal joint which is used in the device, Fig. 3 is a central vertical longitudinal section of the gearing, and Figs. 4 and 5 are sections taken on lines $x$—$x$ and $y$—$y$ respectively of Fig. 3.

The preferred form of construction as illustrated in the drawings comprises a bearing member 1 adapted, when in use, to be held rigid or stationary through the medium of brace rods adapted to engage with perforations 2 provided at the upper and lower ends of the member 1 as clearly shown in Fig. 3. Rotatably mounted in the bearing member 1 is the driving shaft 3 the inner end of which, when the device is in use, being connected with the source of power as will be readily understood by those skilled in the art. Coöperating with the outer end of the shaft 3 is an antifriction roller bearing 4 adapted to serve in the usual capacity. Provided at the upper and lower ends of the bearing member 1 are laterally projecting lugs 5 and 5′ in which are arranged trunnions 6 and 6′, said trunnions being positioned in axial alinement.

Coöperating with the bearing member 1 is a steering knuckle 7 provided at its inner end with inwardly projecting spaced lugs 8 and 8′, said lugs being so spaced as to be adapted to engage against the under sides of lugs 5 and 5′. Adjacent lugs 5 and 8 and 5′ and 8′ are connected by means of the trunnions 6 and 6′ respectively, the trunnion 6 being threaded in the lug 8 and the trunnion 6′ being threaded in the lug 5′ whereby said trunnions are securely held in position. The arrangement is such, as will be seen, that the steering knuckle 7 is so connected with the bearing member 1 as to permit of free oscillatory movement in a horizontal plane or in such a direction as to permit of steering movement of the wheel.

Rotatably mounted in the steering knuckle 7 is a driven shaft 9, said shaft being so arranged that, when the steering knuckle 7 is in central position, said shaft will be in axial alinement with the driving shaft 3. Coöperating with the shaft 9 is an antifriction roller bearing 10 and a bearing sleeve or bushing 11, a nut 12 threaded upon the outer end of shaft 9 serving to lock the same in operative relation with the steering knuckle as will be readily understood.

The adjacent ends of the shafts 3 and 9 are operatively connected by means of a universal joint comprising a rectangular slotted block or housing 13 which is fixed to the outer end of shaft 3 and a pair of spaced blocks 14 carried by the inner end of shaft 9, the latter being pivotally connected with said blocks by means of a pin 15 projecting centrally through said shaft the respective ends of which are mounted in said blocks as clearly shown in Figs. 2, 3 and 5. The blocks 14 fit snugly in the housing 13, the outer sides of said blocks being rounded so as to permit of rocking of said blocks in said housing. With this arrangement it will be seen that a driving connection between the shafts 3 and 9 permitting of universal pivotal movement of the latter relative to the shaft 3 is provided which allows for the necessary movement of said shaft 9 in the steering operation. The center or pivotal point of said universal joint is in axial alinement with the axes of trunnions 6 and 6′ this being obviously necessary in order to permit of the desired movement.

Rotatably mounted upon the outer end of steering knuckle 7 is a wheel hub 16, roller bearings 17 and 18 being interposed between said knuckle and hub in order to reduce friction. A cap nut 19 is threaded upon the outer end of said hub as is usual. Connected by means of bolts 20 with the inner side of hub 16 is an annular member 21 angular in cross section at the inner side of which is formed an internal gear 22. The gear 22 meshes with an idler gear 23 arranged in a slot 24 formed in the upper side of steering knuckle 7, said gear 23 being mounted upon a stud pin 25 as clearly shown in Fig. 3. The idler gear 23 meshes with a gear 26 which is fixed to the driven shaft 9. With this arrangement it will be seen that an operative connection between the shaft 9 and the wheel hub 16 is established through the gears 26, 23 and 22, the gearing employed being such that the wheel hub will be driven at a less speed than the shaft 9, the speed of said hub being preferably one-fourth that of said shaft. At the lower end of the steering knuckle 7 is provided a rearwardly projecting arm 27 as shown in Fig. 1, for connection with steering rods or other steering mechanism in the usual manner.

With a construction as set forth it will be seen that a driving connection is established between the driving shaft 3 of the vehicle and the wheel hub 16, the connection being such however as to permit of free horizontal movement or steering oscillation of said hub. The construction set forth is confined into very small space while at the same time the construction presented possesses great strength and firmness. The gear connection between the driven shaft 9 and the wheel hub whereby the latter is driven at a less speed than the former, results in a development of considerable leverage in the driving of the wheel from the source of power, and at the same time results in evenness and steadiness in the driving operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

In a steerable drive gearing, the combination of a stationary bearing member; a driving shaft rotatably mounted in said bearing member; a steering knuckle connected at its inner end to said bearing member to permit of steering oscillation of said knuckle; said steering knuckle having an outwardly extending tubular portion arranged coaxially with said driving shaft; a driven shaft rotatably mounted in said portion of said steering knuckle having its inner end connected with said driving shaft so as to permit of universal pivotal movement of said driven shaft; a wheel hub removably and rotatably mounted on said steering knuckle; an operative connection between said driven shaft and said hub, said connection comprising an internal gear operatively connected with said hub; a gear fixed to said driven shaft; and an idler gear mounted in said steering knuckle and meshing with said last mentioned gear and said internal gear, substantially as described.

In testimony whereof I have signed my name to this specification in the presence of two subscribing witnesses.

WILLIAM SCHNECKLOTH.

Witnesses:
 HAZEL WIGHTMAN,
 HENRY H. CHESHIRE.